(12) United States Patent
Cowell

(10) Patent No.: US 12,075,156 B2
(45) Date of Patent: *Aug. 27, 2024

(54) CAMERA COLLABORATION CONFIGURATION

(71) Applicant: Justin Dion Cowell, Virginia Beach, VA (US)

(72) Inventor: Justin Dion Cowell, Virginia Beach, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/243,087

(22) Filed: Sep. 6, 2023

(65) Prior Publication Data
US 2023/0421896 A1    Dec. 28, 2023

Related U.S. Application Data

(63) Continuation of application No. 17/863,280, filed on Jul. 12, 2022, now Pat. No. 11,785,337, which is a continuation of application No. 16/746,203, filed on Jan. 17, 2020, now Pat. No. 11,388,326.

(60) Provisional application No. 62/794,550, filed on Jan. 18, 2019.

(51) Int. Cl.
| H04N 23/661 | (2023.01) |
| G06T 17/00 | (2006.01) |
| G08B 13/196 | (2006.01) |
| H04M 1/02 | (2006.01) |
| H04N 23/698 | (2023.01) |

(52) U.S. Cl.
CPC ........ *H04N 23/661* (2023.01); *H04M 1/0264* (2013.01); *H04N 23/698* (2023.01); *G06T 17/00* (2013.01); *G06T 2200/04* (2013.01); *G08B 13/1963* (2013.01)

(58) Field of Classification Search
CPC .......... H04N 5/23206; H04N 5/23238; H04M 1/0264; G06T 17/00; G06T 2200/04; G08B 13/1963
See application file for complete search history.

(56) References Cited

U.S. PATENT DOCUMENTS

| 11,388,326 | B2* | 7/2022 | Cowell | ............... H04M 1/0264 |
| 11,785,337 | B2* | 10/2023 | Cowell | ............... H04N 23/661 348/222.1 |
| 2013/0093897 | A1 | 4/2013 | Fan et al. | |
| 2018/0249115 | A1 | 8/2018 | Cronin et al. | |

* cited by examiner

*Primary Examiner* — Christopher K Peterson
(74) *Attorney, Agent, or Firm* — Kamran Emdadi

(57) ABSTRACT

One example may include determining, via a server, a content capture application is initiated on a mobile device, determining, via the server, one or more content capture devices are proximate to a location specified by the content capture application and are subscribed to a content capturing network associated with the content capture application, transmitting, via the server, a notification to the one or more content capture devices to perform content capturing based on one or more settings of the content capture application, transmitting, via the server, views of content captured by the one or more content capture devices to the mobile device, and receiving, via the server, one or more content selections made by the mobile device.

20 Claims, 20 Drawing Sheets

242

CAMERA COLLABORATION CONFIGURATION

FIELD OF INVENTION

This application relates to a camera or cameras and more specifically to a camera collaboration configuration with a network of collaborated cameras for use by subscribers.

BACKGROUND OF THE INVENTION

The digital cell phone has been around since 1988 thanks to an American inventor by the name of Jesse Eugene Russell, of whom it took from 1984-1988 to build the first digital cellular system in any place in the world. Currently, most digital cellular phones include a camera and most people utilize digital cell phones as the sole device for taking pictures. However, a user is limited to the images and videos captured by their individual devices.

As the popularity of image and video capturing continues to rise, the users are seeking easier ways to solicit more content, faster and without any actions necessary as a condition precedent. For example, a user may currently enact an image capturing function on their mobile device, however, the angles may be limited, also, the user must select the image capturing option to reverse the angle and then hold the camera in a particular position only to take a single photograph or video which may not be an optimal image as compared to some other cameras and/or angles available.

SUMMARY OF THE INVENTION

One example embodiment may include a process or non-transitory computer program product for determining one or more content capture devices are proximate to a location specified by one or more mobile device profile preferences associated with a mobile device and are subscribed to a content capturing network, forwarding content capture instructions to the one or more content capture devices instructing the one or more content capture devices to capture content in accordance with the one or more mobile device profile preferences associated with the mobile device, capturing content, via the one or more content capture devices, based on the one or more mobile device profile preferences, and responsive to capturing the content, automatically uploading the captured content to a specified user profile.

Another example embodiment may include a system that includes a mobile device, a plurality of content capture devices, and a server configured to determine the one or more content capture devices are proximate to a location specified by one or more mobile device profile preferences associated with the mobile device and are subscribed to a content capturing network, forward content capture instructions to the one or more content capture devices instructing the one or more content capture devices to capture content in accordance with the one or more mobile device profile preferences associated with the mobile device, and the one or more content capture devices are configured to capture content, via the one or more content capture devices, based on the one or more mobile device profile preferences, and responsive to capturing the content, automatically upload the captured content to a specified user profile.

Another example embodiment may include determining, via a server, a content capture application is initiated on a mobile device, determining, via the server, one or more content capture devices are proximate to a location specified by the content capture application and are subscribed to a content capturing network associated with the content capture application, transmitting, via the server, a notification to the one or more content capture devices to perform content capturing based on one or more settings of the content capture application, transmitting, via the server, a plurality of views of content captured by the one or more content capture devices to the mobile device, and receiving, via the server, one or more content selections made by the mobile device.

DETAILED DESCRIPTION

According to implementations, an aerial camera coordination ACC system ("ACC system") for mobile devices, such as mobile devices, such as cell phones, smartphones, tablets, etc., captures 'selfies', photos, and/or video according to user device requirements, user device profile preferences, etc., which are setup by a user prior to engaging the application. The ACC system operates on a mobile device to communicate with and capture images and/or video from one or more camera systems ("satellite cameras") located within a particular vicinity of the mobile device. The ACC system provides an interface that permits a user to view the images and/or videos available from the satellite cameras and to select which images and videos to capture from the satellite cameras. For example, the user may pay-per-instance, and thus the user may desire to select the content that is most desired and disregard the content that is undesired. With the ACC system, a user can control what type of image and/or video is captured and rendered by the mobile device, e.g., a regular personal, group, or panoramic view selfie photo/video, from a variety of views and angles.

Figure 1:
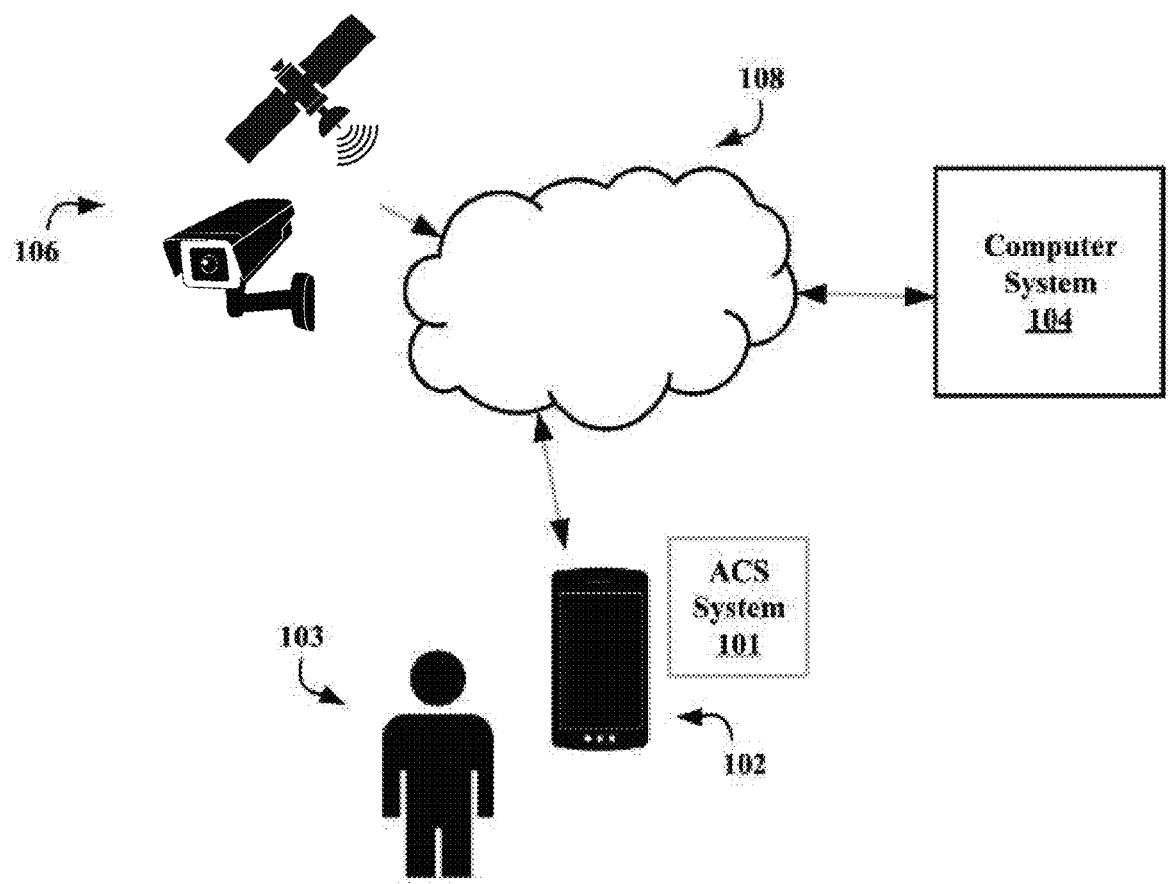
FIG. 1 illustrates a block diagram of an example of a network in which an aerial camera coordination (ACC) system operates, according to example embodiments.

FIG. 1 illustrates a diagram of an example of a network in which an aerial camera coordination (ACC) system operates, according to example embodiments. Referring to FIG. 1, the system network 100 may include a variety of cameras, such as a mounted camera 106, an extraterrestrial satellite camera, or other camera from another user mobile device. Any camera that is compatible with the network of cameras which are known and registered with the application server may perform image/video capturing and sharing with the subscriber 103 of the registered mobile device account of the mobile device 102. A network 108, such as the Internet may provide a backbone for sharing content and account credentials, such as the profile information stored in the computer system 104 (e.g., server, database, etc.). The network system 100 may be a combination of the user interface on the mobile device 102 and the computer system 104, network 108, along with the solicited cameras 106.

The ACC system provides everyday mobile device users a broader use of image capturing capabilities and provides the user with an opportunity to receive more abundant, different and/or higher quality video and images. The ACC system can include image manipulation software and features that permit a user to alter the video captured by the satellite cameras 106. For example, the ACC system 101 permits a user to create movie-like scenes. The ACC system 101 permits the user to create unique photo/video movie scenes by recording in regular, slow motion, high speed, high resolution, and high definition. The ACC system 101 also permits the creation of 3D and 2D animations, thereby permitting the user to take control of their videos and photographic experiences on their own personal mobile devices. As such, the user can send and receive 2D and 3D images and videos to offer users a broader use of their mobile device and beyond the mobile device's capabilities, for example, by turning the mobile device into a professional photo and filming device. The ACC system 101 can also create animation like videos to capture and create unique type images and videos for a more interesting way of filming and capturing photos on a mobile device.

In certain implementations, the ACC system 101 can utilize mobile device cameras with a built-in telescopic retractable lens. The telescopic lens permits the user to bring images from a far away distance, which is beyond a camera's capturing capability, and provide HD and 4K high HD resolution quality, just as if you the user were standing directly in front of the filmed object.

The ACC system 101 can also be used as a security system. For example, when parking in an unsafe environment, the user can activate the panoramic view option. The ACC system will capture images and video from the satellite cameras from the unsafe environment. The ACC system can then display in real-time an overview scene in the area where the user is located to provide various angles which may put the user at ease if no other persons are located in the general area. As such, the user can be alert and aware at all times to attempt to prevent and escape attacks, even in areas where a user's view is quite limited.

As illustrated in FIG. 1, the ACC system 101 is controlled by a mobile device 102. The mobile device 102 can be any type of computer system that can be operated at various locations by a user 103, such as a cell phone, smart phone, tablet, laptop computer, etc. The ACC system can be configured to communicate with a computer system 104 and satellite cameras 106, which includes mounted cameras in ceilings, towers, walls, etc., and in higher locations, such as drones and extraterrestial satellites, and the like, via a network 108. In implementations, the ACC systems 101 can be configured to communicate with and capture images and/or video from the satellite cameras 106 located within an area of the mobile device 102. The ACC system 101 provides an interface that permits a user to view the images and videos available from the satellite cameras 106 and select which images and videos to capture from the satellite cameras 106. As such, the ACC system 101 permits the user 103 of the mobile phone 102 to capture images from different angles and views of the area as described in details below with reference to examples.

In implementations, the satellite cameras 106 can be any type and number of cameras located in the vicinity of the mobile device 102. For example, the satellite cameras 106 can include security cameras installed in the vicinity, cameras on mobile devices located in the vicinity, traffic cameras located in the vicinity, orbital and/or fixed satellite cameras traveling over or positioned near the area, cameras located on drones in the vicinity, cameras located on cell towers, television cameras filing in the vicinity, and the like.

In various implementations, the ACC system 101 (and the components of the ACC system 101) are implemented as software programs or modules that perform the methods, process, and protocols described herein. The software programs or modules can be written in a variety of programming languages, such as JAVA, C++, C #, Python code, Visual Basic, hypertext markup language (HTML), extensible markup language (XML), and the like to accommodate a variety of operating systems, computing system architectures, etc.

In various implementations, the ACC system 101 can communicate with the computer system 104. The computer system 104 can be configured to communicate with the satellite cameras 106 and assist the ACC system 101 in the capture and manipulation of the images. For example, the computer system 104 can be configured to capture, manipulate (e.g., sharpen, dull, focus, clip, expand, etc.), and store images from the satellite cameras 106.

Figure 2A:
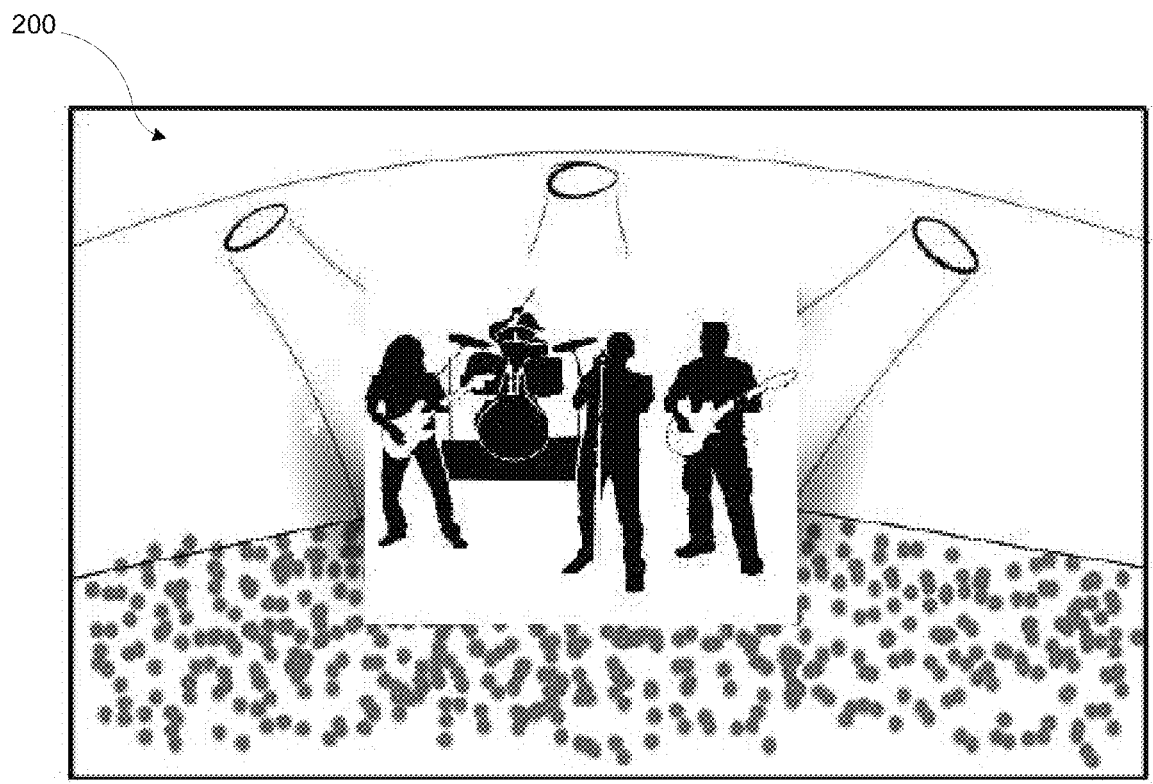
FIGS. 2A-2F illustrate an example of the operation of the ACC system, according to example embodiments.

FIG. 2A-2F illustrate an example of concert venue in which the ACC system can be used, according to various implementations. In implementations, the ACC system permits a user to select and capture unique images and videos using one or more cameras located around the concert venue, referred to as 'satellite cameras'. FIG. 2A illustrates a concert stage scene from an aerial snap shot view captured with one or more of the satellite cameras. As illustrated in FIG. 2A, the ACC system, controlled by a mobile device, can present a user with various scenes and views that can be captured by the satellite cameras located around the concert venue. The user can select the desired scene and capture the scene using the satellite cameras, for example, the concert stage. As such, the ACC system permits the user to take an aerial view photo of the concert stage 200, front and center, to bring the photo to life with amazing views to demonstrate the stage from every possible angle from anywhere in the venue that the cameras can capture content data.

Figure 2B:
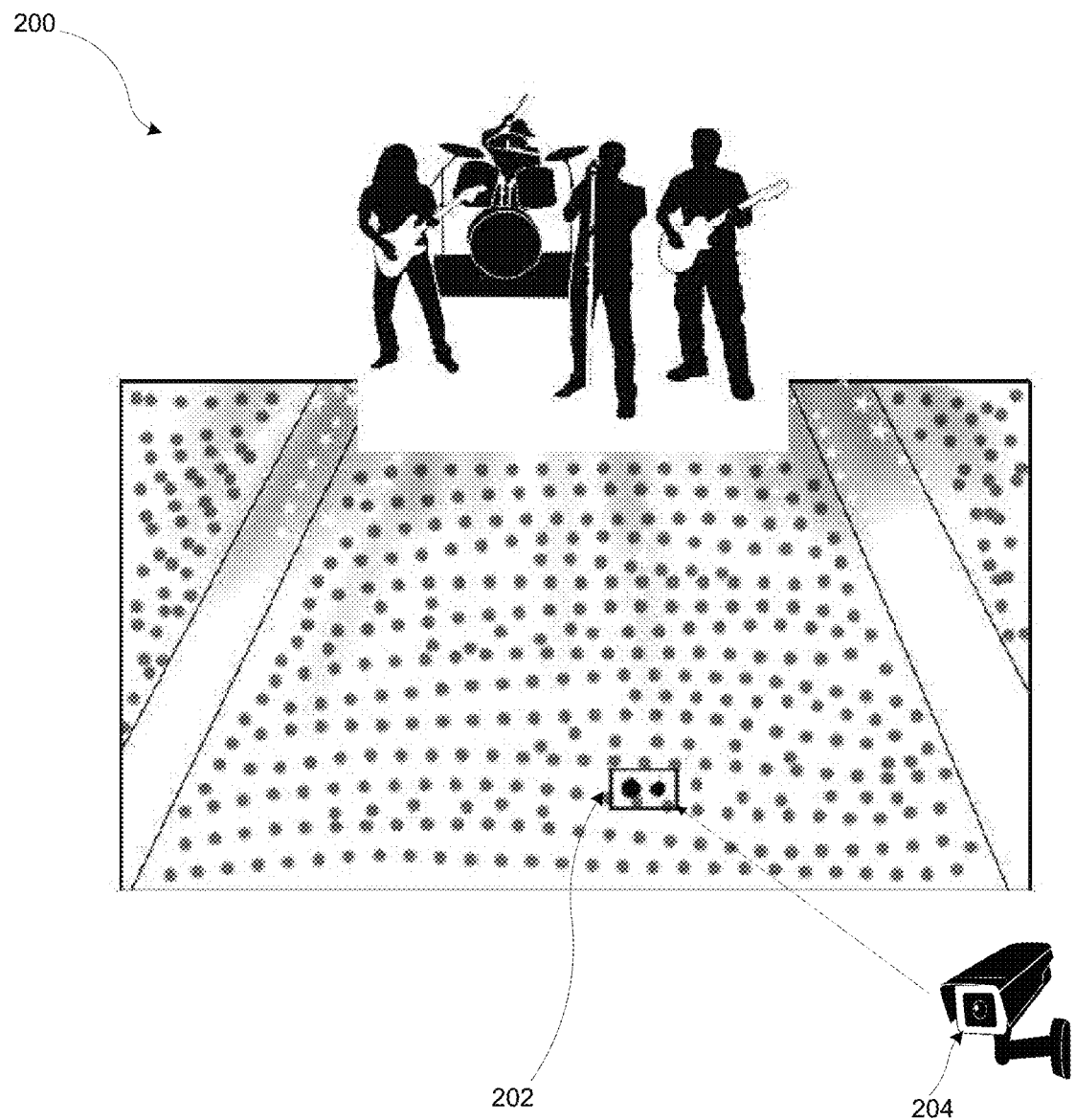

As illustrated, FIG. 2B the geolocation features of the mobile device can be utilized to identify the location of the user and capture a corresponding image or video using the satellite cameras. As shown in both FIGS. 2A and 2B, the ACC system can generate and add graphics and other details to the images and videos captured by the satellite cameras, such as a box highlighting a scene. As such, the ACC system captures an image or video that provides a bird's eye view of where the user is seated at the venue. This allows the user to share the location with friends and share photo moments of the event. For example, the user can send the location image or video to friends that are running late to the concert or any crowded outdoor event in order to assist with locating the user(s) 202 as observed from a solicited accessible camera 204 which may be owned and operated by a third party.

Figure 2C:
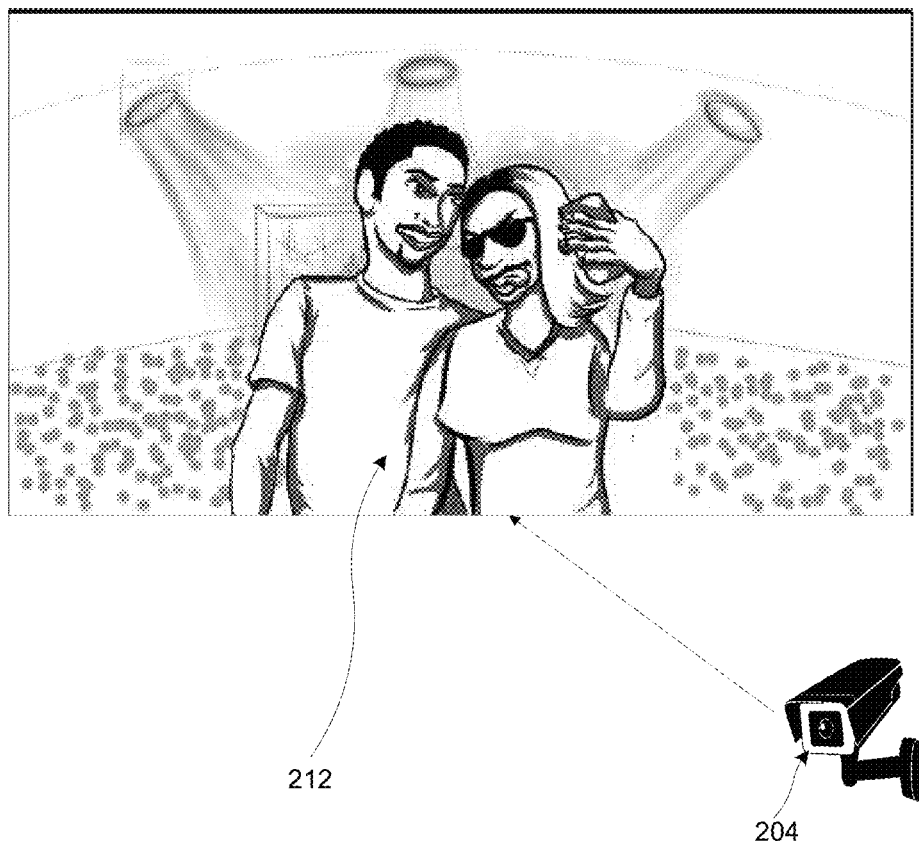
Figure 2D:
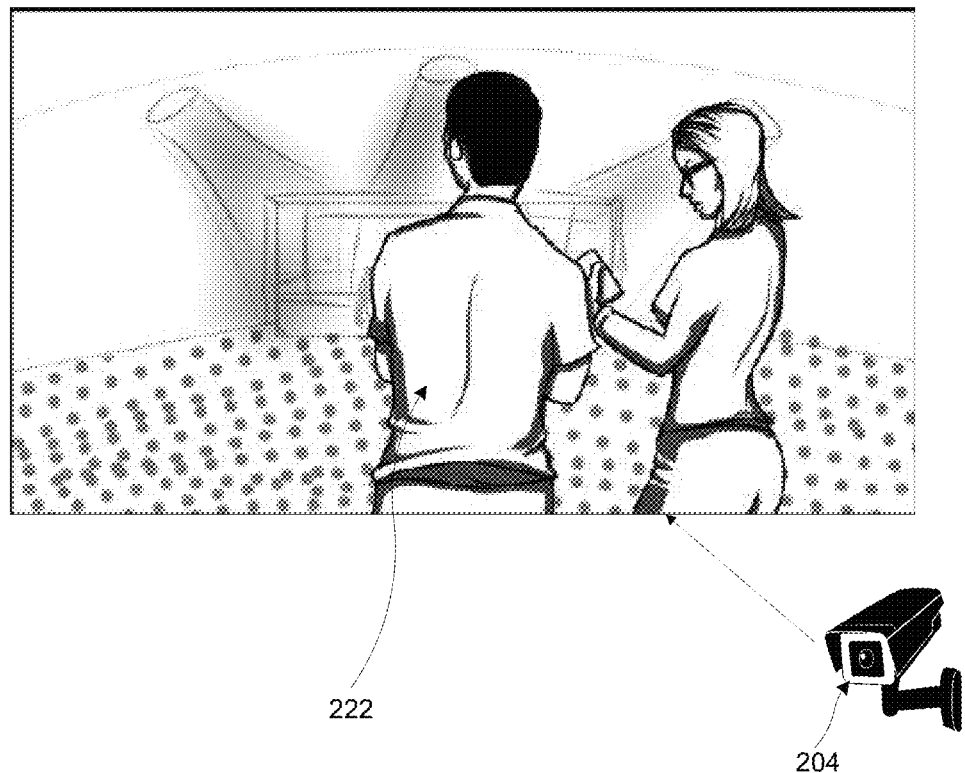

As illustrated in FIGS. 2C and 2D, the ACC system can allow a user(s) 212 to select and capture images or video from various angles 222 using the satellite cameras 204, such as a selfie with the user and a participant in all angular views such as original, side, rear, aerial, and birds-eye view.

Figure 2E:
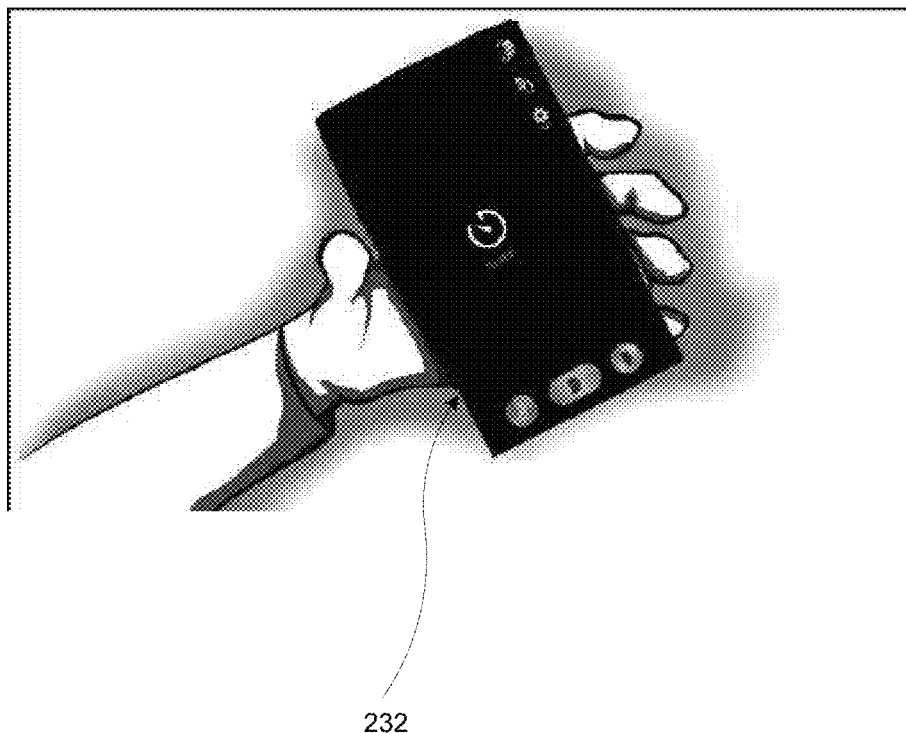
Figure 2F:
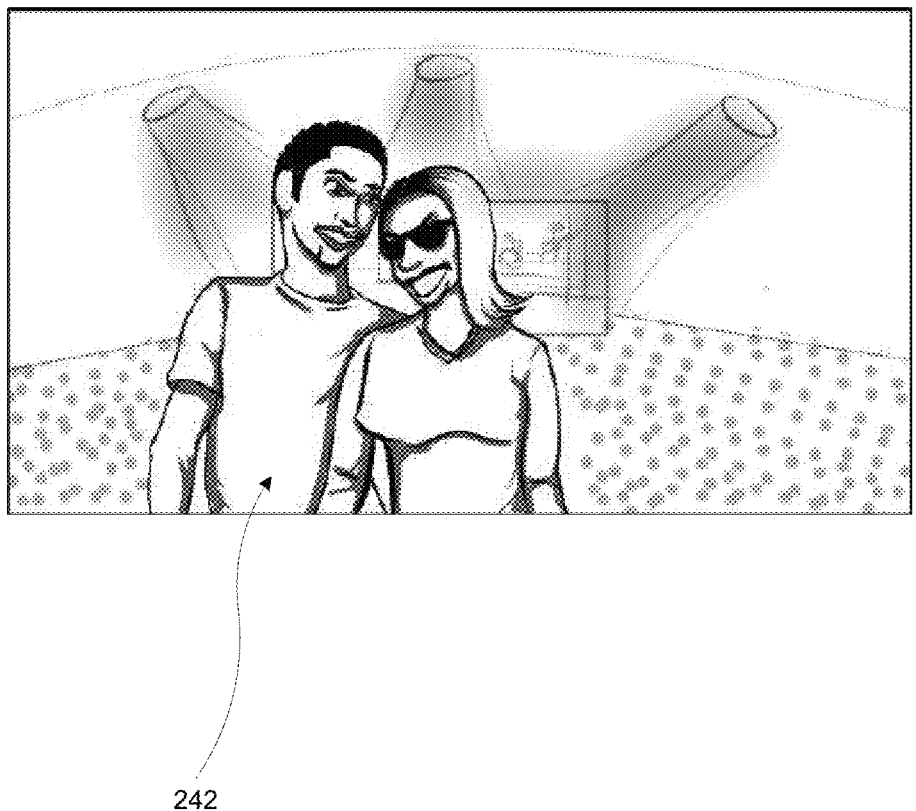

As illustrated in FIG. 2E, the ACC system can provide a countdown timer on the mobile device 232 so that user can set a time for a picture to be captured. This allows the user to set a countdown timer in order to shoot the perfect photo at any angle, orientation, and or format. The countdown timer can provide an audio count aloud to let the user and the participants know when and how to pose for a selfie, whether it's an aerial view, side view, rear view or original view selfie, the timer will give you the user that chance to pose your best camera shot without having to repeat that pose or view all within a single shot. For example, as illustrated in FIG. 2F, the user can set a timer and then pose with a participant to capture a unique selfie 242 without holding the phone in front of the user and the participant thereby creating a professional photo.

In implementations, with the timer, the satellite cameras, and the multiple cameras and censors built in the mobile device itself, the user can set a countdown timer and select the type of view you the user would like, whether its aerial, side, bird's eye, rear, or just original selfie mode, thereby allowing the user and participants to pose before the countdown timer expires. With these features, the user can store the mobile device in his or her pockets to listen for the countdown aloud to capture the perfect selfie at any angle, orientation, and or format for 2D to 3D purposes using satellite cameras. Additionally, because the ACC system has access to multiple images and videos from the satellite cameras, the ACC system can create 2D and 3D images, video, aerial and birds eye view to create the scenes needed to capture these types of angles, orientations, and format.

Figure 3A:
FIGS. 3A and 3B illustrate another example of the operation of the ACC system, according to example embodiments.
Figure 3B:
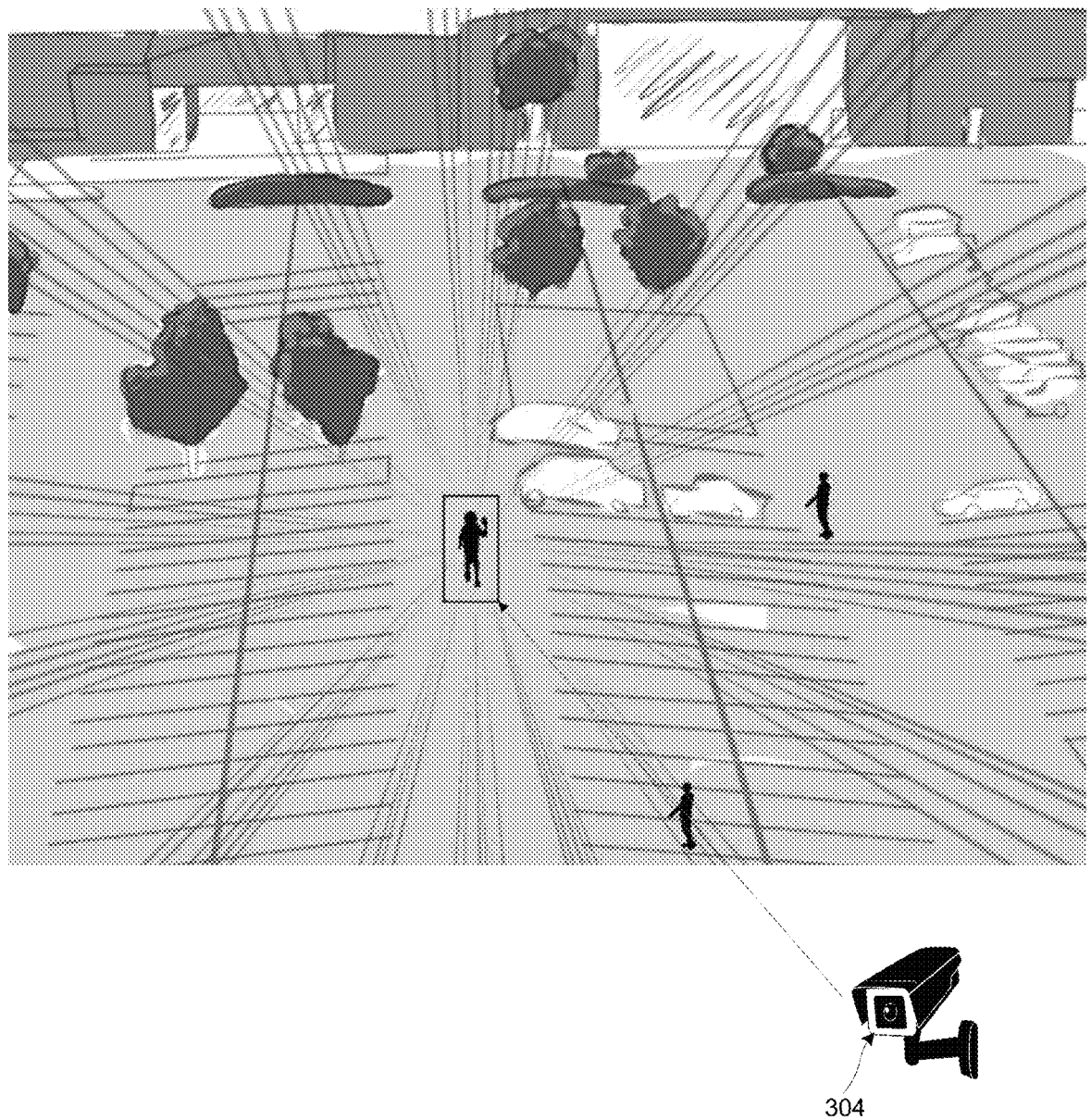

FIGS. 3A and 3B illustrates another example of the use of the ACC system according to various implementations. In this example, a user entering a parking lot can access the ACC system on a mobile device and one or more camera located at the parking lot ("satellite cameras"). The ACC system can access the satellite cameras located around the parking lot, for example, security camera installed around the parking lot. As illustrated in FIG. 3B, the user can access the ACC system and set-up an aerial security view 302 to show the surroundings and to show all areas of the parking lot that may not be in direct line of sight of the user. In this example, the ACC system can capture and create 2D or 3D images and videos for any angle such as an aerial, birds-eye, rear view, etc. In implementations, the user can select either view or combine all views as mentioned above to take a complete scan of the area in question before exiting entering the parking lot.

In implementations, the ACC system can capture and create an aerial security view that shows live footage of the parking lot as the user travels from one place to another. As illustrated in FIG. 3B, the aerial security view can include an overhead real-time scene of the parking lot, e.g., a grocery store parking lot as a user travels from her vehicle to the entrance. As illustrated, the user can utilize the aerial security view to identify two guys that could be potential kidnappers or purse snatchers. This gives the user the opportunity to be alert at all times, even when their potential predators are not even in plain view. This also gives the user the opportunity whether or not to use "this particular location," e.g., grocery store, or to proceed to use a safer one. All this can be done before even exiting the vehicle to ensure safety of the user. This scenario may also be applied to the concert example, especially if a third party wants to monitor the user, such as child or young adult while attending the concert. The mobile device will be a guide which triggers all the available cameras to capture images/video of the mobile device, so a third party (i.e., parent) can monitor the mobile device location at all times via updated photos taken periodically according to user preferences.

As discussed above, the satellite cameras used by the ACC system can include the camera of the mobile device of the user. FIGS. 4A-4D illustrate one type of mobile device camera that can be used by the ACC system. The mobile device camera can include a telescopic lens features that allows a user to zoom when taking images or videos. In implementations, the telescopic lens 404, which is a physical system built into the mobile device itself. The telescopic lens allows the user to control as to how far of a distance you the user would like to capture an image. In implementations, such as FIG. 4A, when the image capture software is activated on the mobile device, the telescopic lens activate and extends from the housing of the mobile device. Once the image capture software is deactivated, the telescopic lens can automatically retract back into the phone to prevent damage to the lens itself.

Figure 4A:
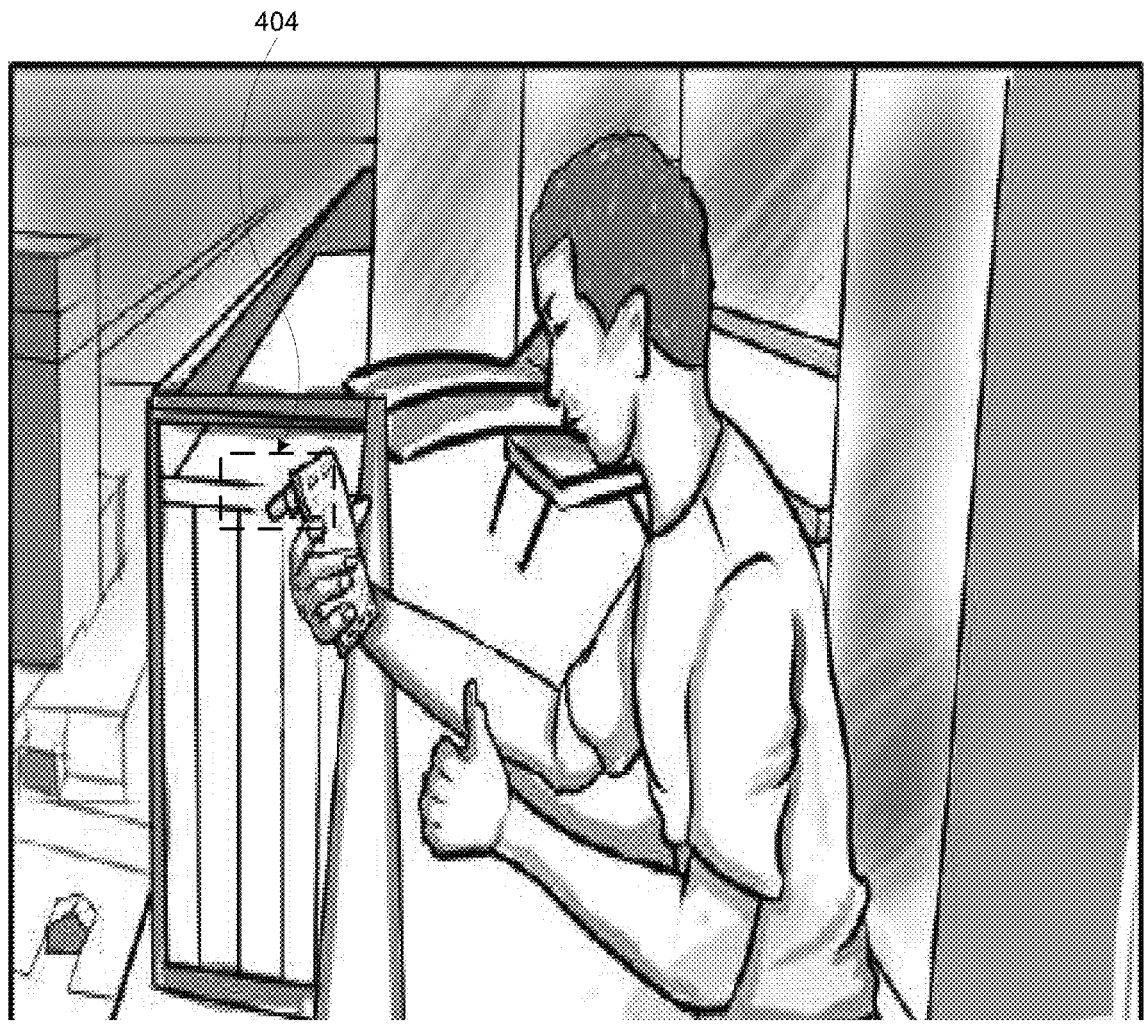
FIGS. 4A and 4B illustrate an example of a user attempting to capture content at a distance, according to example embodiments.
Figure 4B:
Figure 4C:
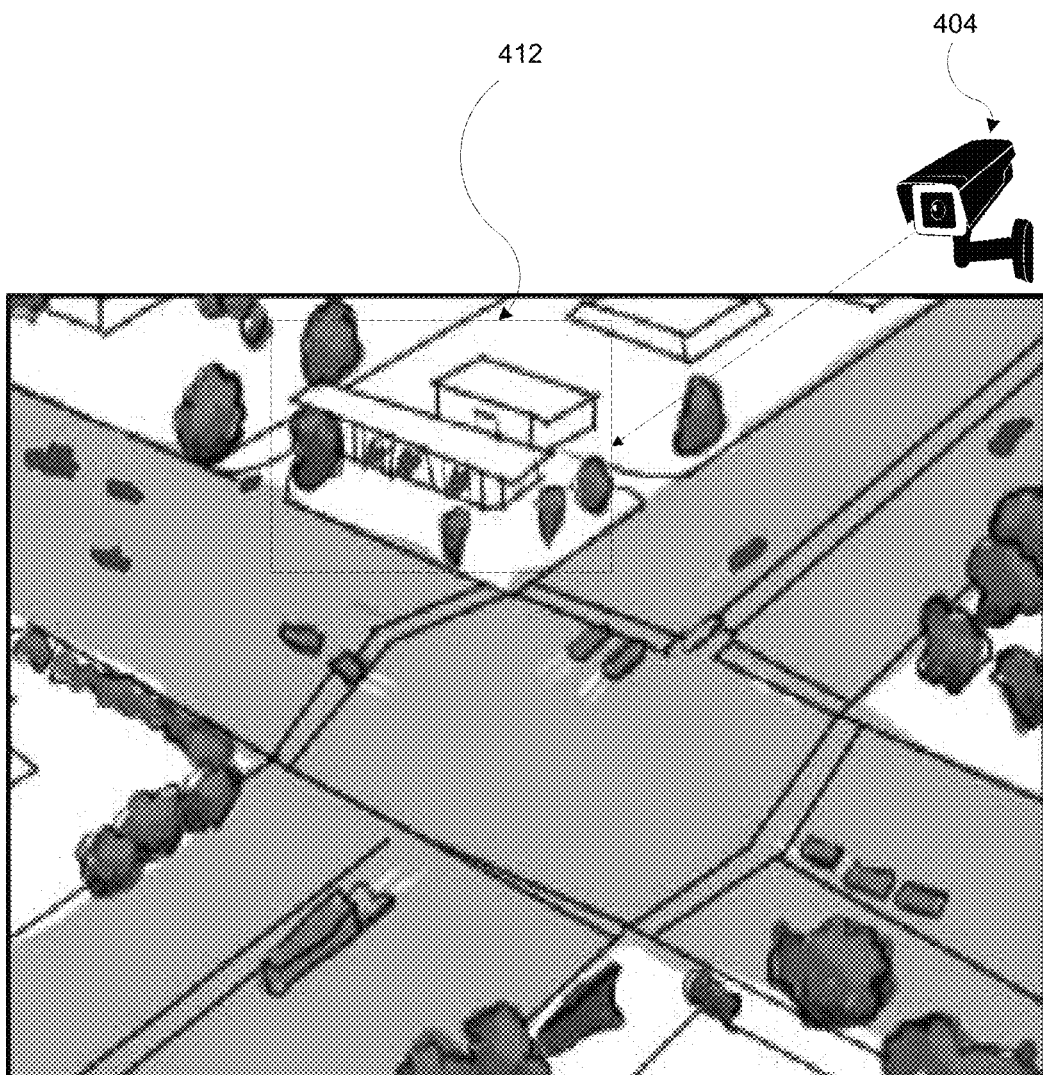
FIGS. 4C and 4D illustrate an example of a user attempting to capture content at a distance with the assistance of a remote in-network camera, according to example embodiments.

As illustrated in FIG. 4A, the user can activate the telescopic feature of the mobile device camera 404 to shoot at a long range distance as demonstrated in FIG. 4B. When the camera lens is fully extended outward, it gives the user the option to capture a faraway scene in high quality, high resolution photo and or video. For example, as illustrated in FIGS. 4A and 4B, the user can be located at the top floor of a high-rise residential building attempting to film a video or take an image capture with the mobile device 406 of a service station 408 across the street. FIG. 4C shows a major intersection and a gas station across the street, along with the distance between where the user is located and the gas station 412 where the user wants to focus. In this example, the user sets the mobile device camera to wide angle to show a clear view of the gas station of which the user is planning to shoot, without the telescopic lens activated. As shown, without the telescopic lens activated, the image shows a blurred view of the vehicles at the gas pumps and their occupants at their vehicles. If the user wants to solicit a satellite camera 404 to assist with a better angle or a better close-up view, the application may provide the ability to select available in-network cameras 404 which are available to capture images of the point of interest 412.

Figure 4D:
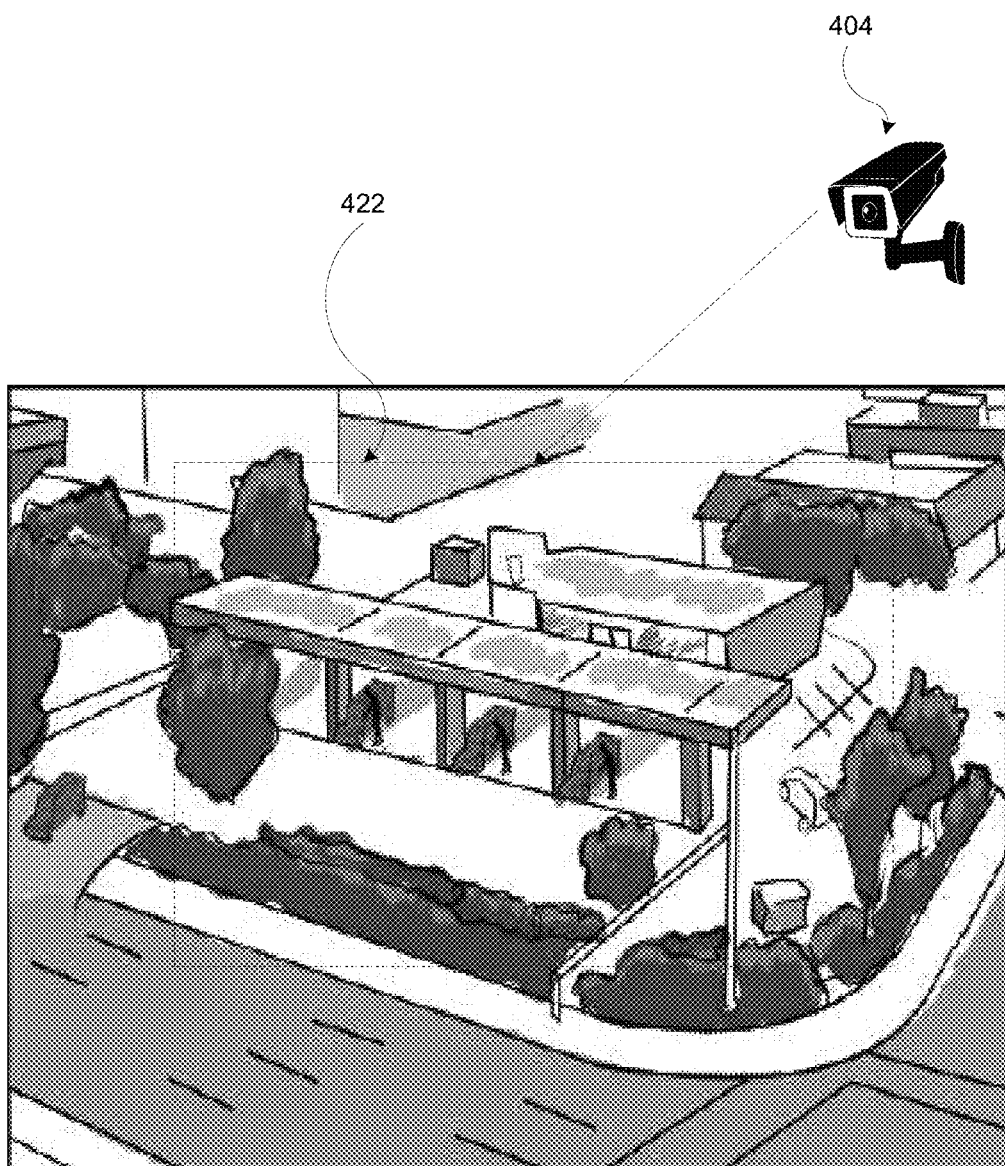

As illustrated in FIG. 4D, the user can activate the telescopic lens, as illustrated in 404, in order to zoom into the scene. As illustrated, the occupants occupying their vehicle appear in focus from a far. This feature sets itself far beyond of which a normal camera on a mobile device is able to accomplish in high resolution and high definition fashion using a digital zoom. However, the user may find the camera angle and distance to be unsatisfactory, and thus the solicited camera 404 may provide a preview of the quality available, such as the example 422, which shows a quality and proximity as if the user was standing on the other side of the street looking directly at the location of interest. The camera 404 may identify the correct angle from navigational and location data associated with the mobile device, such as latitude, longitude, azimuth, view information from an image captured by the mobile device, accelerometer data, gyroscope data, etc. The camera can then attempt to recreate the desired content by changing it's angle via a telescoping lens, a mechanical motor, etc. The camera perspective data can be shared by the server to the camera device 404 to ensure the correct angle is selected prior to recording data.

Figure 4E:
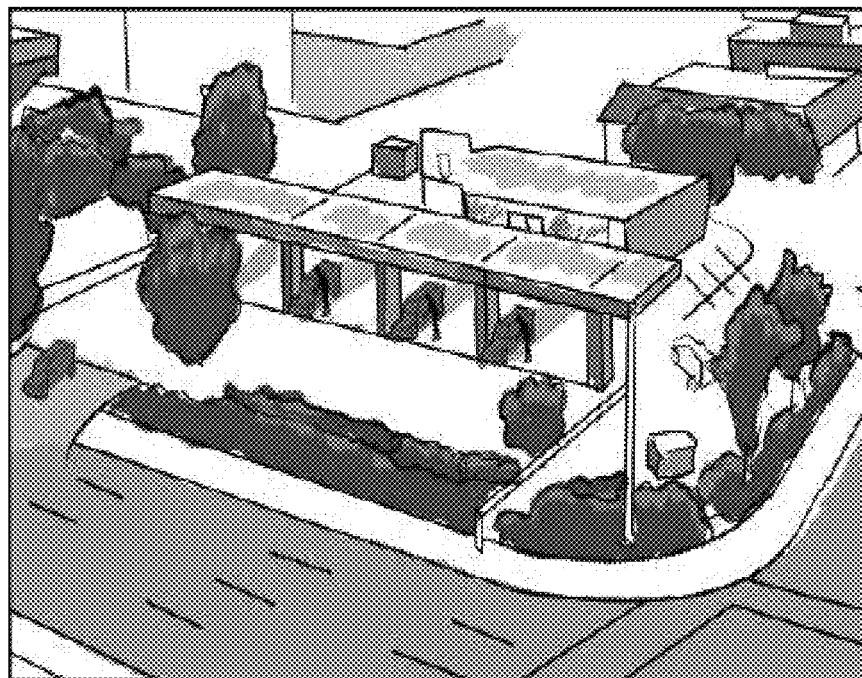
FIG. 4E illustrate an example of a remote user device attempting to capture content on behalf of the original user device requesting an optimal camera angle, according to example embodiments.
Figure 4E:
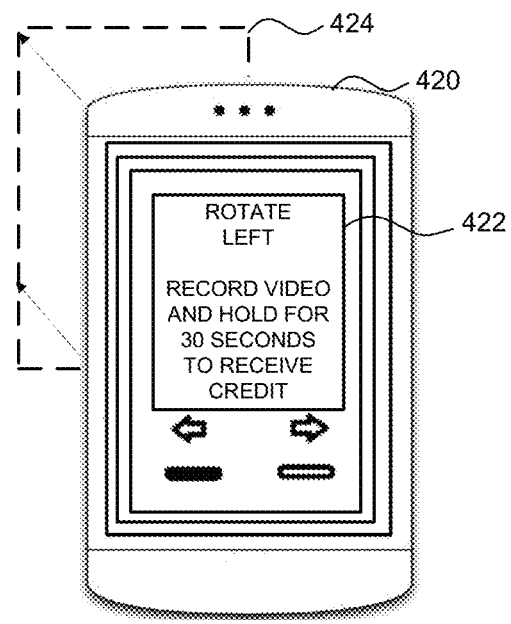

FIG. 4E illustrate an example of a remote user device attempting to capture content on behalf of the original user device requesting an optimal camera angle, according to example embodiments. In this example, the original user device 406 may have accessed the in-network camera application to identify potential cameras which are available for hire to assist with a better angle and perhaps a closer view. In this example, the device 420 may be operated by a user standing across to the street and much closer to the facility than the original user and user device. The original user angles desired are known by the mobile device orientation data, which may include specific navigational and location data associated with the mobile device, such as latitude, longitude, azimuth, view information from an image captured by the mobile device, accelerometer data, gyroscope data, etc. The device 420 may then receive commands from a server via a data network connection and may be prompted 424 to move one direction or the other (e.g., move left 424) until the correct angle and position are achieved. Once the angle and view is correct on the solicited device 420 as requested by the requesting device 406 (see FIG. 4B), then the instructions may dictate how long a video should be recorded, how many images to capture, etc., in order to receive credit for the effort. The user account of the mobile device 420 may then receive a credit for the effort assuming the instructions and actions were achieved (e.g., seconds of video).

Figure 5:
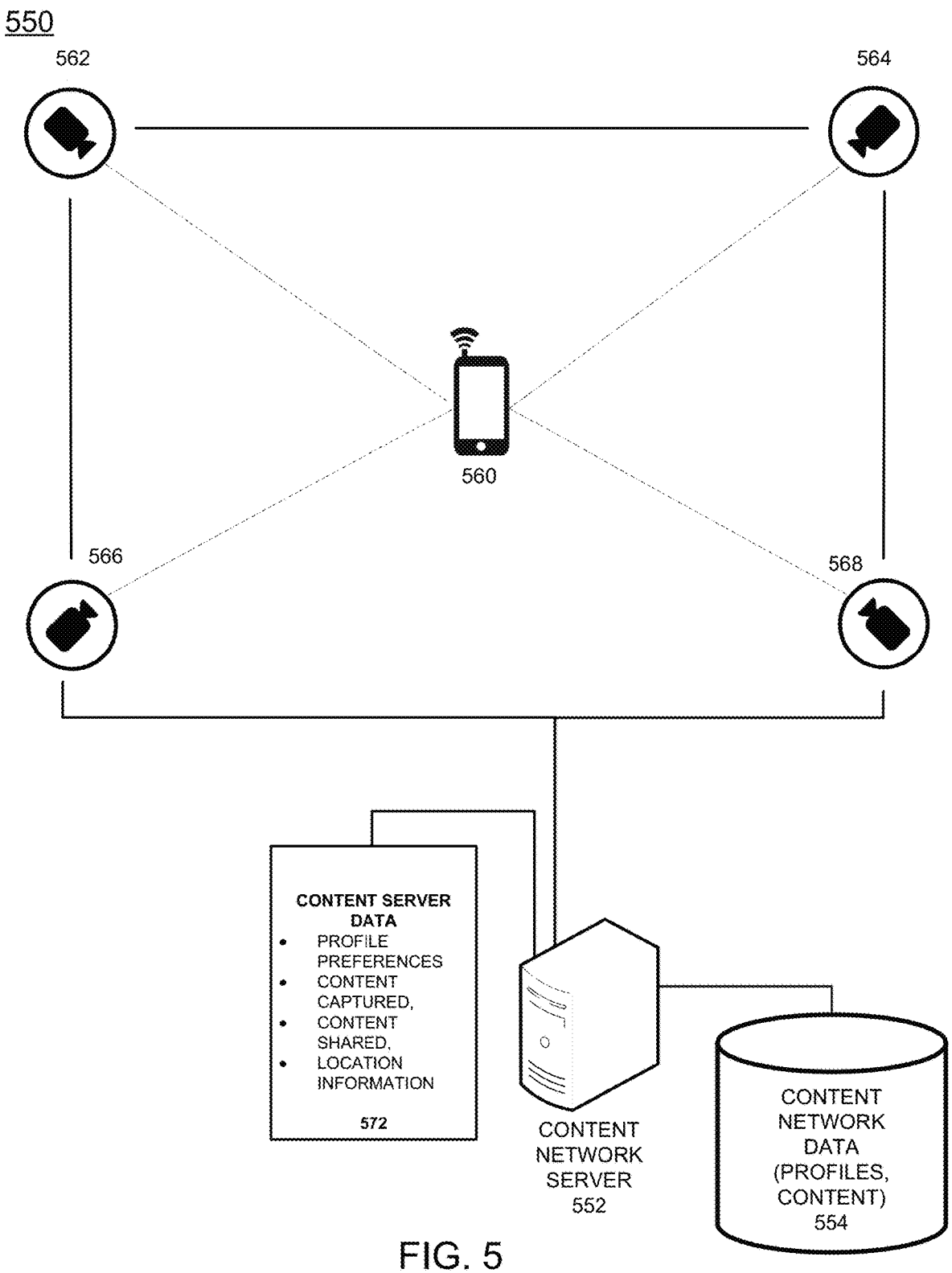
FIG. 5 illustrates an example image capturing network of image capturing devices operating with a mobile device as part of a content capturing subscription network, according to example embodiments.

FIG. 5 illustrates an example image capturing network of image capturing devices operating with a mobile device as part of a content capturing subscription network, according to example embodiments. Referring to FIG. 5, the example configuration 550 demonstrates a scenario where the mobile device 560 may be in any type of forum, location, environment with accessible cameras/content capturing devices 562-568. The content server 552 may be in communication with the mobile device 560 and the capturing devices 562-568. The application accessed by the user device 560 may be automated to solicit any cameras within 200 yards of the mobile device to take X number of images per hour, X number of minutes of video every 30 minutes, etc. The content server data may include profiles of the user devices 560 which include those and other preferences for content capturing events along with other data 572 to optimize the content capturing experience. The content network data may be stored in a separate databank 554 and retrieved and updated when changes occur. This provides the user of the mobile device 560 with an opportunity to have content capturing occur anywhere the mobile device 560 may move, provided that the devices are present to offer such services. The devices may operate on a credit system where users are subscribed to the services for image sharing, automated social network status updates, and/or security and safety reasons. One example may include a major event status option where a user profile elects to have any major event (e.g., major venues), documented with a few photos and videos and automatically updated to the user's personal account, social network site, etc. This saves the step of uploading content and provides interested parties with a way to identify the security of a mobile device user.

At a venue, such as a concert venue, the users are subscribers that take photos and have an option to add other angles of other cameras which are not their own mobile device camera. The option can be an add-on interface feature that when selected can seek to establish a session with other cameras. The cameras may be part of a network that is linked to the user device profile. The cameras 562-568 can provide angles of the users which are identified via the mobile device location via a local signal transmission (e.g., BLUETOOTH, WIFI, GPS, etc.), or a network based signal received from a remote server that is communicating with the mobile device via mobile data. Once the additional camera(s) are identified as being part of the same communication network and subscription, the user may select the angles they desire, such as from the side, overhead, from the rear, etc., and submit requests to keep those images which may be part of a subscription package that includes a certain amount of camera angles for a particular subscription value service (e.g., cost, time, etc.). Users may also accumulate credits by offering the same service to others. For example, the users may be standing in a particular position and may log into a service that identifies their location and their mobile device orientation. The service may instruct the user to begin capturing images via their mobile device camera at a particular angle. Each image and/or a particular amount of time capturing images/video may be required for the user to receive a credit value.

Figure 6A:
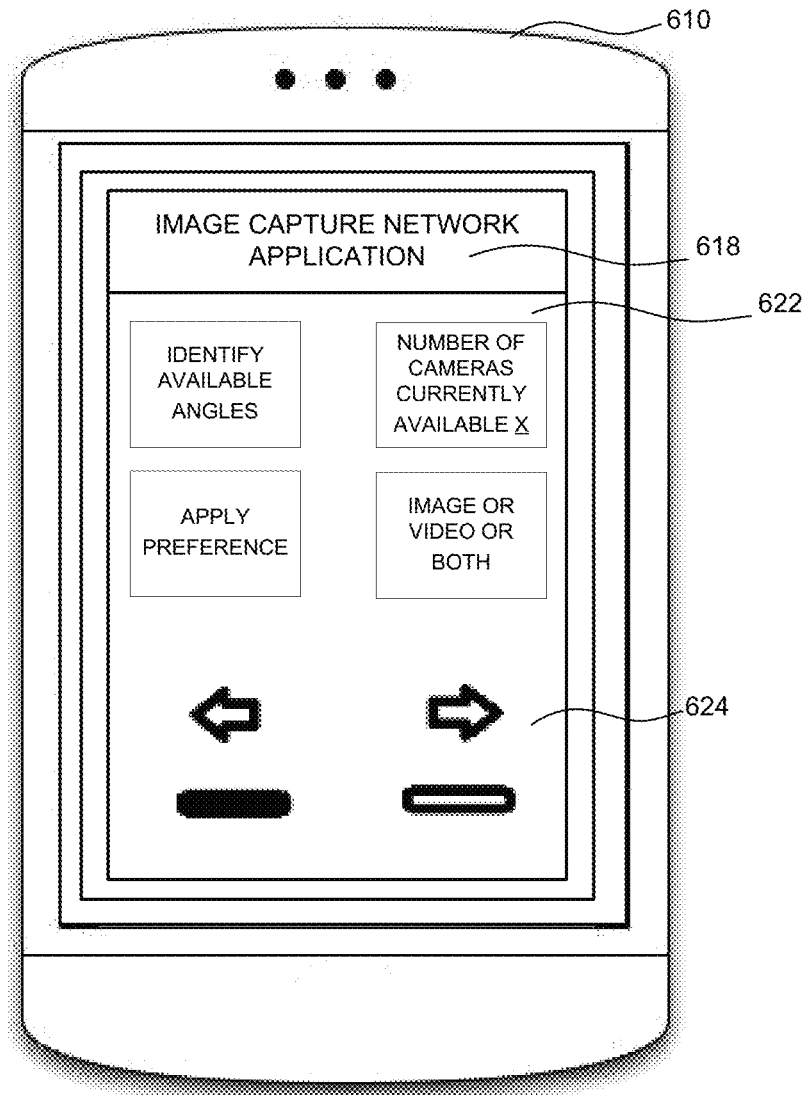
FIG. 6A illustrates an example graphical user interface of an image capturing network application operating on a user mobile device, according to example embodiments.

FIG. 6A illustrates an example graphical user interface of an image capturing application operating on a user mobile device, according to example embodiments. Referring to FIG. 6A, the example configuration 600 includes a user device 610 which is operating the media (image/video/audio) capture application 618 to solicit other in-network devices as part of a set of preferences and information used to identify and select media to capture 622. Other operations may be selected via menu selection buttons and operators 624. This provides the user with an opportunity to identify how and what the user desires to capture from neighbouring devices.

Figure 6B:
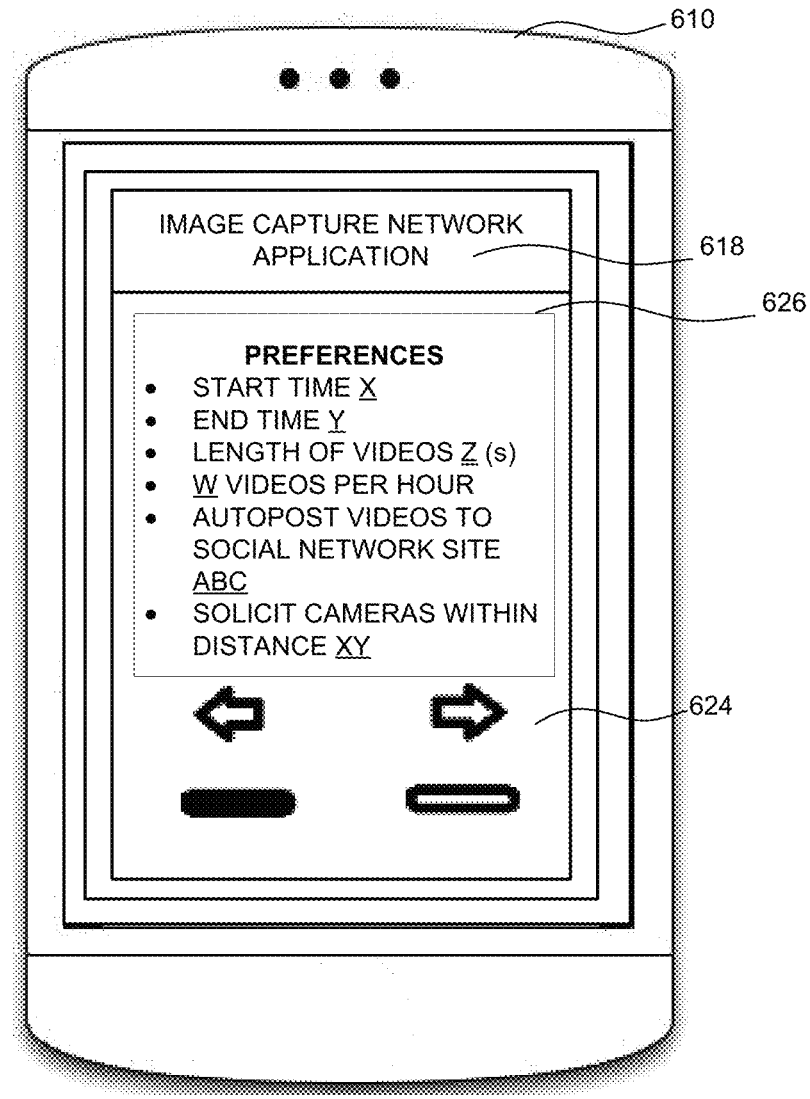
FIG. 6B illustrates another example graphical user interface of an image capturing network application operating on a user mobile device, according to example embodiments.

FIG. 6B illustrates another example graphical user interface of an image capturing application operating on a user mobile device, according to example embodiments. Referring to FIG. 6B, the configuration 650 demonstrates the specific types of preferences a user may have initiated 626 as part of an image capture sequence. For example, a user may enter a start time, such as when the concert or adventure begins and an end time during which the third party capturing devices may be solicited and when they are no longer solicited for media capture. A length of videos may also be selected, some users may desire short 10 second videos while others prefer videos which are 2 minutes long, a number of videos/images per hour, an option to automatically post the images to an online social network account to save the step of doing so at a later time, and a distance measurement for minimum and maximum distances that a camera location with respect to the mobile device may be selected to participate in the media capture process.

Figure 7A:
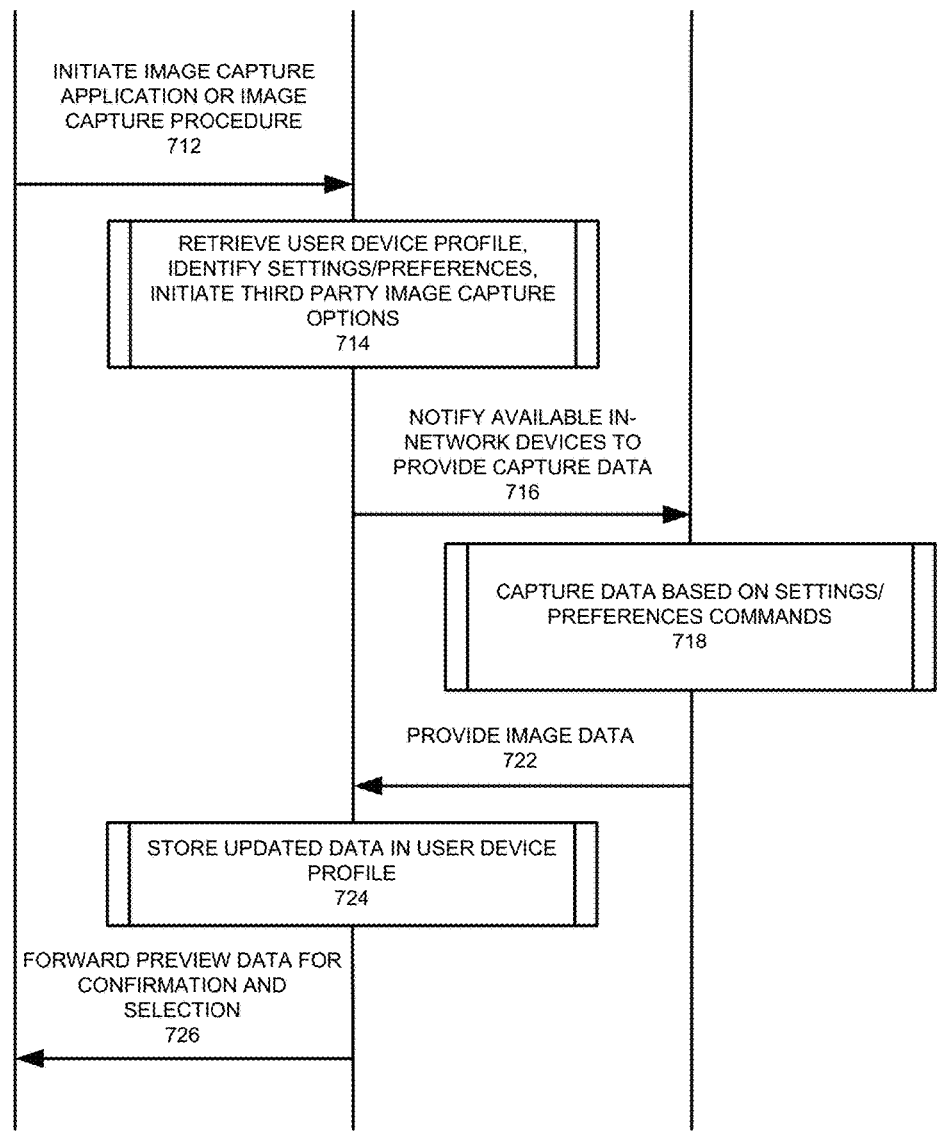
FIG. 7A illustrates an example system configuration of a user device accessing content captured from a remote camera/capture device, according to example embodiments.

FIG. 7A illustrates an example system configuration of a user device accessing content captured from a remote camera, such as 709 and the like, according to example embodiments. Referring to FIG. 7A, the system 700 includes a user 'A' 702, a user device 704, an application server 710 and a capture device 709. The example process may include the user device being used to initiate an image capture process 712, and the server 710 would retrieve the user profile and identify settings 714 and preferences to apply to the available network of image capture devices. The devices which qualify for usage would be enabled to begin image capturing at the appropriate times and according to the preferences 716. The captured data would be performed according to the preferences 718 and provided 722 to the server 710. The profile and image store would be updated to include the new media captured 724. The user device may receive a preview of the content captured to decide what to select and not select 726.

Figure 7B:
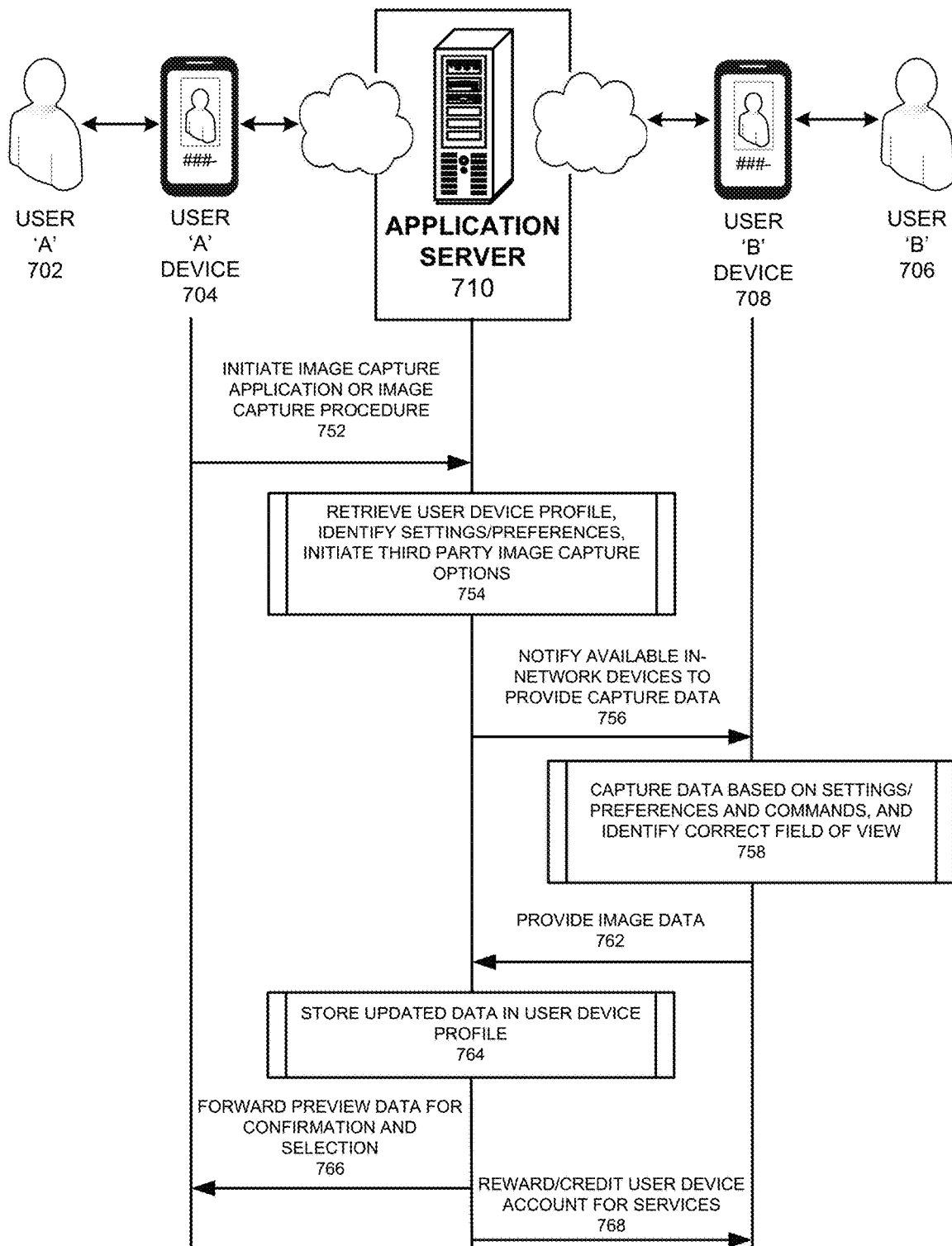
FIG. 7B illustrates an example system configuration of a user device 'A' accessing content captured from a remote user device 'B', according to example embodiments.

FIG. 7B illustrates an example system configuration of a user device accessing content captured from a remote user device, according to example embodiments. In another example, the camera may be replaced with another user device 708 and user 706 that operates the device, the similar process 752-756 may be performed as that in the example of FIG. 7A, however, the user device 708 may have specific command prompts sent to ensure the angles, views, distances, filters, etc., are setup properly 758 so the requesting user device 704 and its preferences are all satisfied. Then the data is sent back 762 for storage 764 and preview purposes 766, if necessary. If the user selects or agrees to the keep the image data then the user account for user device 708 is compensated 768.

One feature of the application operating on the mobile device may include a trigger to start using another device instead of just relying on different angles, of the original device. For example, the user may capture an image(s) or video data from a camera on the mobile device. The user may zoom in via a physical zoom function on the mobile device, such as a telescoping lens and/or a digital zoom function that processes image data to appear closer to the device. However, a user may desire to capture additional image data that is even closer than the camera can provide or from an angle the user cannot obtain due to constraints, such as when filming from an urban landscape, the edge of a mountain, a balcony of a multi-story building, etc. When the zoom function is maximized and/or when the user accepts a better potential location and angle, another user device may be solicited via a notification or other communication function. If the additional camera(s) across the street or at the closer location is a shared camera that participates in image data sharing, then the user may begin receiving a live feed from that camera and may be able to control other features of the additional camera. If that camera provides one or more of a tilt, zoom, pan, etc., feature, then the user mobile device may be able to control those features of the additional camera(s) once the communication and subscription service have initiated. If the other camera is another user device, then the user of the another user device may receive an instruction to move the camera capture angle to a different location that matches the position and angle sought by the original mobile device. (e.g., image matching, location determination, angle matching via image processing, gyroscope information, map matching, etc.). Responsive to a zoom maximum operation and/or a certain period of time, the camera can solicit network cameras automatically.

Figure 8:
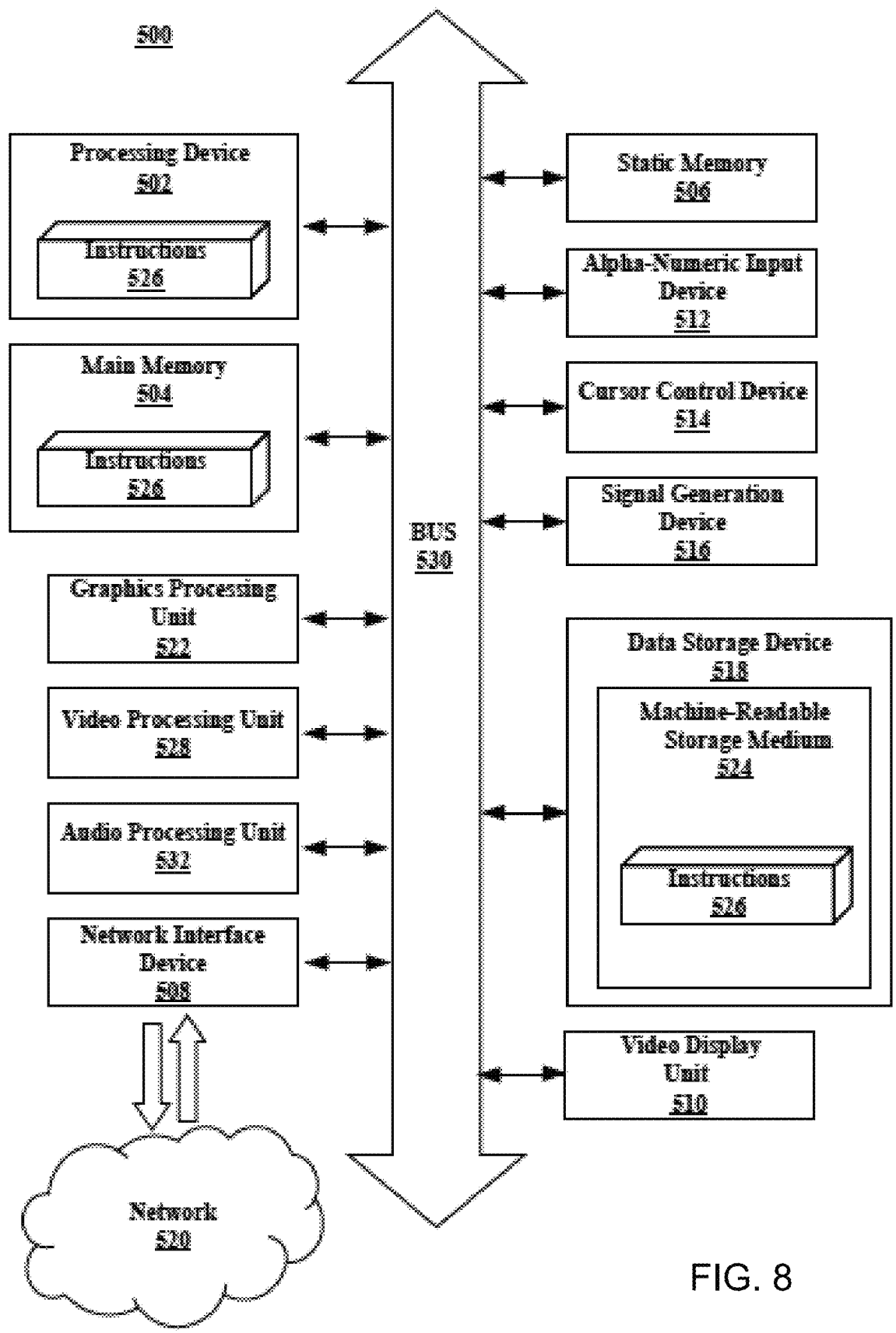
FIG. 8 illustrates an example of a computer system configured to support the example embodiments.

FIG. 8 illustrates an example machine of a computer system within which a set of instructions, for causing the machine to perform any one or more of the methodologies discussed herein, can be executed. In implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" also includes any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. For example, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets.

The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 further includes a network interface device 508 to communicate over the network 520. The computer system 500 also includes a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media.

In implementations, the instructions 526 include instructions to implement functionality corresponding to the components of a device to perform the disclosure herein. While the machine-readable storage medium 524 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" also includes, but not be limited to, solid-state memories, optical media, and magnetic media.

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the detailed description, references are made to the accompanying figures, which illustrate specific examples of various implementations. Logical and structural changes can be made to the examples of the various implementations without departing from the spirit and scope of the present teachings. The detailed description is, therefore, not to be taken in a limiting sense and the scope of the present teachings is defined by claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some embodiments are implemented by a computer system. A computer system can include a processor, a memory, and a non-transitory computer-readable medium. The memory and non-transitory medium can store instructions for performing methods and steps described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be configured with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., materials, shapes, sizes, etc.) thereto.

What is claimed is:

1. A method comprising:
   determining, via a server, a content capture application is initiated on a mobile device;
   determining, via the server, one or more content capture devices are proximate to a location specified by the content capture application and are subscribed to a content capturing network associated with the content capture application;
   transmitting, via the server, a notification to the one or more content capture devices to perform content capturing based on one or more settings of the content capture application;
   transmitting, via the server, a plurality of views of content captured by the one or more content capture devices to the mobile device; and
   receiving, via the server, one or more content selections made by the mobile device.

2. The method of claim 1, wherein the one or more content capture devices comprise one or more of additional mobile devices and mounted cameras.

3. The method of claim 1, wherein the notification comprises content capture instructions to instruct the one or more content capture devices of a time frame to perform the content capturing.

4. The method of claim 1, wherein the one or more settings of the content capture application comprises one or more preferences to apply to the one or more content capture devices.

5. The method of claim 1, wherein the determining the one or more content capture devices are proximate to the location comprises determining a plurality of the content capture devices are within a distance of the mobile device.

6. The method of claim 1, comprising
   identifying an orientation of the one or content capture devices and that the one or more of the content capture devices are within a distance of the mobile device.

7. The method of claim 1, comprising
   storing a plurality of content captured in a user profile associated with content capture application.

8. A server comprising:
   a processor configured to
   determine a content capture application is initiated on a mobile device;
   determine one or more content capture devices are proximate to a location specified by the content capture application and are subscribed to a content capturing network associated with the content capture application;
   a transmitter configured to transmit
      a notification to the one or more content capture devices to perform content capturing based on one or more settings of the content capture application;
      a plurality of views of content captured by the one or more content capture devices to the mobile device, and
   a receiver configured to receive one or more content selections made by the mobile device.

9. The server of claim 8, wherein the one or more content capture devices comprise one or more of additional mobile devices and mounted cameras.

10. The server of claim 8, wherein the notification comprises content capture instructions to instruct the one or more content capture devices of a time frame to perform the content capturing.

11. The server of claim 8, wherein the one or more settings of the content capture application comprises one or more preferences to apply to the one or more content capture devices.

12. The server of claim 8, wherein the determination that the one or more content capture devices are proximate to the location comprises the processor being configured to determine a plurality of the content capture devices are within a distance of the mobile device.

13. The server of claim 8, wherein the processor is further configured to identify an orientation of the one or content capture devices and that the one or more of the content capture devices are within a distance of the mobile device.

14. The server of claim 8, wherein the processor is further configured to store a plurality of content captured in a user profile associated with content capture application.

15. A non-transitory computer readable storage medium comprising instructions that when executed cause a processor to perform:
   determining, via a server, a content capture application is initiated on a mobile device;
   determining, via the server, one or more content capture devices are proximate to a location specified by the content capture application and are subscribed to a content capturing network associated with the content capture application;
   transmitting, via the server, a notification to the one or more content capture devices to perform content capturing based on one or more settings of the content capture application;
   transmitting, via the server, a plurality of views of content captured by the one or more content capture devices to the mobile device; and
   receiving, via the server, one or more content selections made by the mobile device.

16. The non-transitory computer readable storage medium of claim 15, wherein the one or more content capture devices comprise one or more of additional mobile devices and mounted cameras.

17. The non-transitory computer readable storage medium of claim 15, wherein the notification comprises content capture instructions to instruct the one or more content capture devices of a time frame to perform the content capturing.

18. The non-transitory computer readable storage medium of claim 15, wherein the one or more settings of the content capture application comprises one or more preferences to apply to the one or more content capture devices.

19. The non-transitory computer readable storage medium of claim 15, wherein the determining the one or more content capture devices are proximate to the location comprises determining a plurality of the content capture devices are within a distance of the mobile device.

20. The non-transitory computer readable storage medium of claim 15 wherein the processor is further configured to perform:
   identifying an orientation of the one or content capture devices and that the one or more of the content capture devices are within a distance of the mobile device.

* * * * *